United States Patent
Dewis

(10) Patent No.: US 6,863,509 B2
(45) Date of Patent: Mar. 8, 2005

(54) SPLIT SEAL PLATE WITH INTEGRAL BRUSH SEAL

(75) Inventor: David W. Dewis, Stuart, FL (US)

(73) Assignee: Elliott Energy Systems, Inc., Stuart, FL (US)

( * ) Notice: Subject to any disclaimer, the term of this patent is extended or adjusted under 35 U.S.C. 154(b) by 88 days.

(21) Appl. No.: 10/341,370

(22) Filed: Jan. 13, 2003

(65) Prior Publication Data
US 2004/0136844 A1 Jul. 15, 2004

(51) Int. Cl.[7] ............................. F04B 17/00; F04B 1/18
(52) U.S. Cl. ..................... 417/407; 417/113; 417/366; 417/373; 417/369
(58) Field of Search ............................. 415/113, 174.2, 415/231; 417/407, 366, 373, 369, 381, 375

(56) References Cited

U.S. PATENT DOCUMENTS

| | | | | |
|---|---|---|---|---|
| 2,918,207 A | * | 12/1959 | Moore | 417/373 |
| 4,725,206 A | * | 2/1988 | Glaser et al. | 417/407 |
| 5,233,824 A | * | 8/1993 | Clevenger | 60/805 |
| 5,664,413 A | * | 9/1997 | Kington et al. | 60/799 |
| 6,053,699 A | * | 4/2000 | Turnquist et al. | 415/231 |

* cited by examiner

Primary Examiner—Cheryl J. Tyler
Assistant Examiner—Timothy P. Solak
(74) Attorney, Agent, or Firm—Norman Friedland

(57) ABSTRACT

A segmented seal plate supporting a brush seal mounted in the space between the compressor and turbine and bearing against the shaft of a microturbine engine form a barrier in this cavity and serves to control flow in this space. A plurality of circumferentially spaced discretely sized holes in the seal plate judiciously located above the brush seal bearing against the shaft interconnecting the back-to-back mounted compressor/turbine controls the amount of cooling air so that the combination of the brush seal, segmented plate and discretely sized holes controls the leakage from the compressor of each engine of a given model and controls cooling flow to the turbine for reducing efficiency scatter from engine to engine.

6 Claims, 2 Drawing Sheets

SPLIT SEAL PLATE WITH INTEGRAL BRUSH SEAL

TECHNICAL FIELD

This invention relates to sealing mechanism and cool air metering means for a microturbine engine and more particularly to means for controlling the cooling flow to the turbine by utilizing a segmented brush seal mounted between the compressor and turbine and surrounding the shaft of a microturbine engine and judiciously locating discrete holes for controlling the cooling flow.

BACKGROUND OF THE INVENTION

As one skilled in this technology appreciates, the efficiency of the gas turbine engine such as a microturbine engine increases as the temperature of the engine working medium at the turbine increase. However, because of the limitations of the structural integrity of the material of the turbine, it is necessary to cool the turbine in order to take advantage of the high temperature of the engine working medium. In a microturbine engine the turbine is cooled by allowing a portion of the air in the compressor to leak and fill the cavity between the compressor and turbine to define a buffer zone to prevent back flow of high temperature engine working medium from the turbine to migrate into this cavity and to utilize this air to cool the turbine. This has been the manner in which the turbine has been cooled in those types of microturbine engines where the compressor rotor and turbine rotor are mounted back to back. Since the cooling flow is predicated on the amount of leakage flow allowed to migrate from the compressor, it is quite apparent that this flow is not a controlled amount and can vary from engine to engine. The impact of this variance is that the efficiency of each of the engines coming off of the assembly line varies. Inasmuch as the efficiency of the engine is one of the parameters that is relied on in the engine's specification, it is abundantly important to maintain a predictable efficiency for each of these engines. In accordance with this invention, the leakage flow from the compressor is controlled by sealing off the path between the turbine and compressor and locating discrete holes to meter the leakage flow in order to regulate the amount of total flow of cooling air being taken from the compressor and hence, eliminates or at least reduces efficiency scatter for all of the engines being manufactured. Because of the varying load conditions the microturbine encounters, the shaft interconnecting the compressor and turbine has the tendency of deviating from its given path and these excursions interfere with maintaining proper clearances for obtaining good or even adequate sealing. This invention has found that brush seals have the advantage over other types of seals because they handle excursions without adversely affecting the sealing capability of the seal.

The prior art is replete with disclosures of brush seals for sealing rotary shafts to prevent the high pressure fluid on one side of the seal to leak into the low pressure fluid on the other side of the seal. As disclosed in U.S. Pat. No. 5,639,211 granted to Bintz on Jun. 17, 1997, a brush seal is mounted on the foot of the stator vane of a gas turbine engine and bears against the rotating shaft so as to seal the upstream side of the stator from the downstream side of the stator vanes. That is to say, the brush seal serves to prevent the higher pressure engine working medium upstream of the stator vanes to migrate to the lower pressure side on the downstream side of the stator vanes. In this configuration the backing plate for the bristles of the brush seal is a split ring that fits onto the foot of the stator vane and the front plate or segmented retainer is mounted back to back with the backing plate and the bristles are sandwiched therebetween. As is the case of most of the brush seals, the backing plate is radially longer than the fore plate and is mounted so that the high pressure of the fluid forces the most rearward bristles against the longer extending portion of the retaining mechanism. The bristles may be oriented at an angle relative to the rotational direction of the shaft or may be chamfered to assure maximum wear characteristics. Typically, in a jet engine where the seals are subjected to a hostile environment, the brush seals are made from a relative stiff material that is capable of withstanding substantially high temperatures, say in the range of 1400 degrees Fahrenheit to 2000° F. or higher. An example of suitable material is cobalt alloy wire although any other suitable high temperature resistance material could be used. In many of the brush assemblies the tufts or highly packed bristles are typically welded or brazed on one end to the backing plate while the other end extends radially to engage the shaft in a cantilever fashion.

U.S. Pat. No. 6,250,879 granted to Lampes on Jun. 26, 2001 and incorporated herein by reference discloses an example of a brush seal utilized to seal the high temperature fluid adjacent the turbine of a gas turbine engine and the turbine static support structure supporting the turbine rotor.

U.S. Pat. No. 5,480,162 granted to Beeman, Jr. on Jan. 2, 1996 and incorporated herein by reference is another example of a brush seal mounted between static parts of a gas turbine engine and is subjected to extremely hot temperatures. This seal serves to prevent combustion gases in the combustor from escaping from the vanes of the stator vanes feeding engine working medium to the turbine while avoiding loses of engine working medium so as to maximize TSFC, thrust specific fuel consumption, and consequently, avoid a deficit in fuel consumption so as to maintain a high engine efficiency.

U.S. Pat. No. 6,457,719 granted to Fellenstein, et al and incorporated herein by reference, exemplifies a brush seal that includes a plurality of circumferentially spaced holes in the backing plate to provide a leakage path from the high pressure side to the low pressure side through the bristles. This disclosure is particularly suited for sealing between stationary and rotary components and serves to provide an alternative leakage path so that the bristle loadings in the region adjacent the edge of the backplate is less than what is understood to be the situation in prior known brush seal applications. In this disclosure, since the leakage flow through the bristle pack region between the back plate and the sealing surface is less than those designs prior to the subject disclosure, the probability of deformation of the bristles due to high loadings is reduced.

This invention contemplates judiciously mounting the brush seal/seal plate between the cantilevered mounted compressor/turbine so that the bristles of the brush seal bear against the shaft that is rotary supporting the compressor and turbine in a microturbine engine and define a barrier therebetween. This arrangement serves to control the leakage of the higher pressure compressor air to the back face of the turbine and assures that the lateral excursions of the shaft will not produce spikes of flow variations. This arrangement serves to assure that the brush seals at this location of the engine of all the same model engines being manufactured during a given interval will have the same amount of leakage throughout their operating range and the turbine will operate at relatively the same temperature throughout its operating envelope and hence, the efficiency from engine to engine coming off the assembly line remains constant.

SUMMARY OF THE INVENTION

An object of this invention is to provide a seal plate and brush seal in a judicious location of the microturbine engine.

A feature of this invention is to provide a segmented seal plate and locate leakage holes therein above the bristles so as to control the cooling flow to the turbine for assuring constant leakage amongst the same microturbine engine models.

The foregoing and other features of the present invention will become more apparent from the following description and accompanying drawings.

Figure 1:
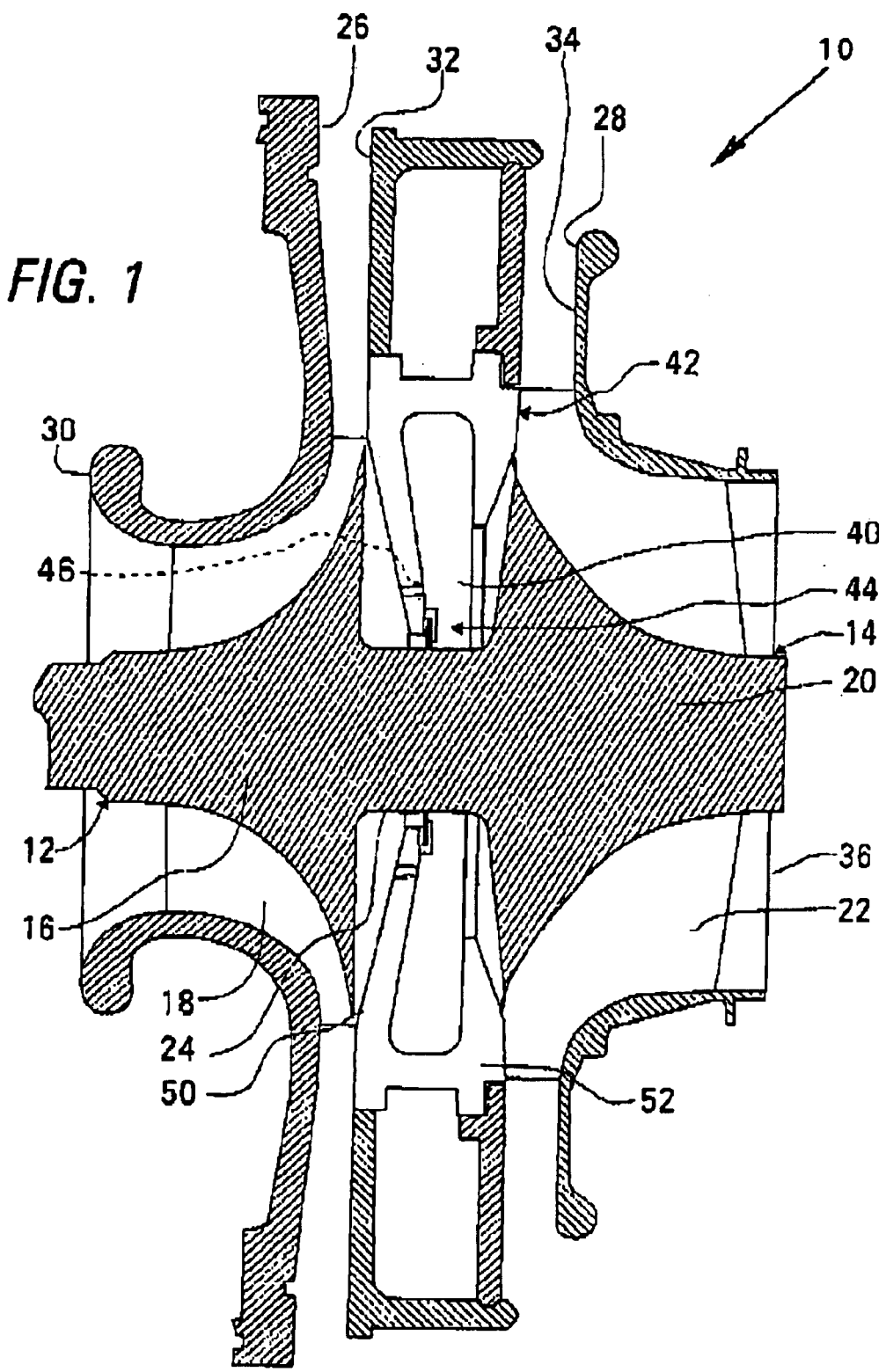
FIG. 1 is a partial sectional view illustrating the brush seal of this invention mounted between the compressor and turbine of a microturbine engine.
Figure 2:
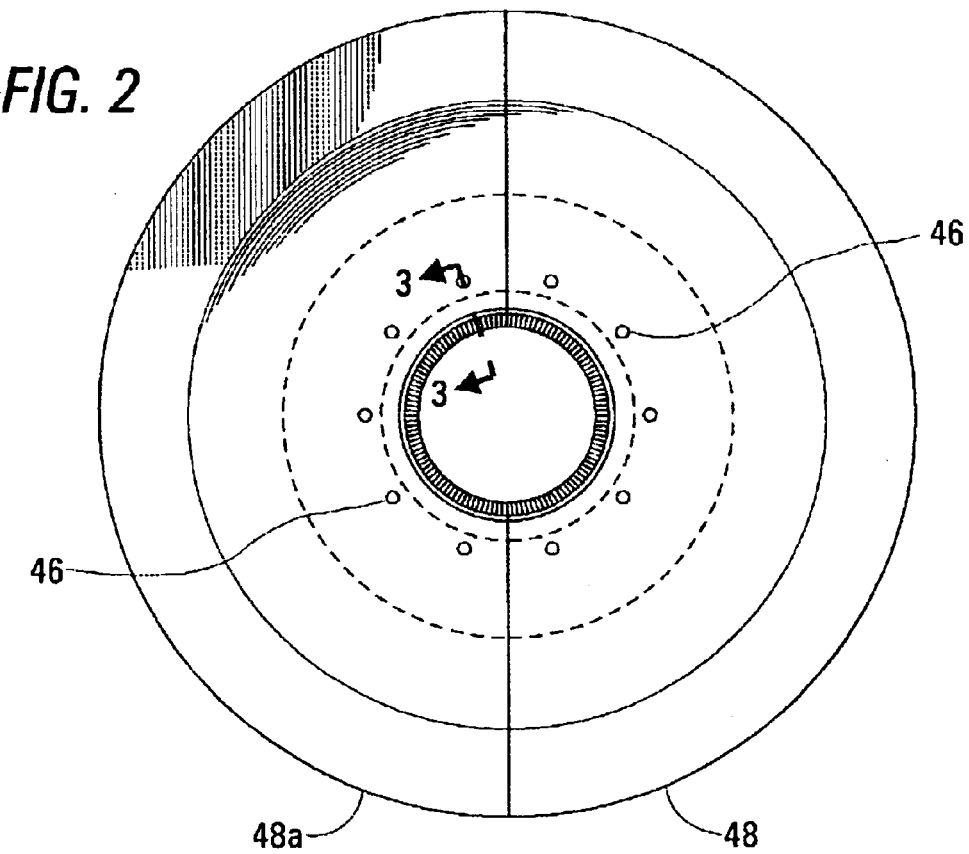
FIG. 2 is a plan view showing the details of the segmented brush seal of this invention.
Figure 3:
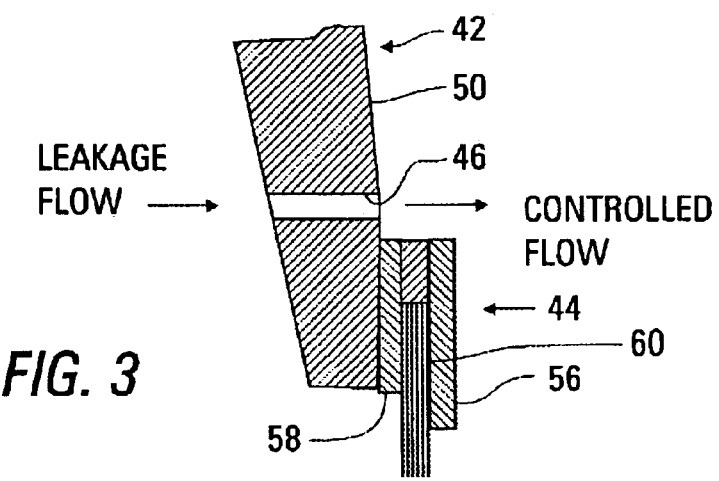
FIG. 3 is a sectional fragmentary view of the brush seal configuration of this invention taken along lines 3—3 of FIG. 2.

These figures merely serve to further clarify and illustrate the present invention and are not intended to limit the scope thereof

DETAILED DESCRIPTION OF THE INVENTION

In the description of the invention that follows immediate hereinbelow, the particular configuration, the material and the mounting of the bristles are not considered apart of this invention and these elements of the brush seal can be selected from any of the prior art brush seals noted in the patents referenced in the above paragraphs or taken from any of the other prior art disclosures or can be well known, commercially available bristles. However, the material of the brushes must be able to withstand high temperatures, say in the range of 1200° Fahrenheit. As will be described in more detail hereinbelow, the segmented brush seal of this invention is judiciously located between the cantilevered mounted compressor and turbine of a microturbine engine, which heretofore was never included in any heretofore known microturbine engine designs. Further the leakage holes in the seal plate are judiciously located and discretely sized to control the cooling flow which is important to insure that the leakage for all of the manufactured comparable engines is the same and hence, this part of the engine will not affect the efficiency of each of the engines coming off the assembly line differently. In other words, the leakage holes are designed to assure that the efficiency of all the like models of microturbine engines being produced are the same.

This invention is not to be confused with the disclosure in U.S. Pat. No. 6,457,719, supra, which discloses a plurality of holes in the brushes mounting plate so as to provide a second leakage path in order to reduce or eliminate deformation of certain bristles in the brush seal. Essentially, this disclosure provides the second leakage path because where the velocity of the fluid through the bristles is sufficiently high, the flow has the tendency of deforming those bristles that are located immediately adjacent to the back plate supporting the bristles. The inclusion of the additional leakage pack reduces the velocity at this location and hence, reduces or eliminates the tendency for the bristles in this location to deform. In the present invention, the brush seal is located in a quiescent environment where the flow and pressure drop across the bristles are relatively low. Hence, there is no problem of deformation of the bristles located adjacent to the back plate. On the other hand, this invention is concerned with maintaining a uniform efficiency for all the engines of this model coming off the assembly line to remain constant, a concept far removed from that described in the immediate above.

The invention can best be seen by referring to all of the Figs. which is a fragmentary illustration of the microturbine engine identified by reference numeral 10 which comprises a compressor 12 mounted back to back to the turbine 14. The microturbine system, which is not shown here, includes a microturbine engine typically powering an electrical generator system for producing electricity and a recuperator for preheating the compressor discharge air before being admitted into the combustor. The microturbine engine is essentially a gas turbine engine that is reduced in size compared with engines designed to power aircraft or other vehicles and the like. For the sake of simplicity and convenience the details of these components, i.e., the details of the microturbine engine such as the combustor, the housing, the flow path and the like, the recuperator, and the system being powered are all eliminated herefrom and for further details reference should be made to the following prior art documents or systems:

Co-pending patent application Ser. No. 09/934,640 filed on Aug. 22, 2001 by William R. Ryan entitled *RECUPERATOR FOR USE WITH TURBINE/TURBO-ALTERNATOR*, published;

U.S. Pat. No. 6,314,717 granted to Teets et al on Nov. 13, 2001 entitled *ELECTRICITY GENERATING SYSTEM HAVING AN ANNULAR COMBUSTOR* (both of which are commonly assigned to the assignee of this patent application, and both being incorporated by reference herein);

The microturbines manufactured by the assignee, Elliott Energy Systems, Inc., of Stuart, Fla. and, particularly of the types exemplified by Model Number TA-80.

The compressor 12 consists of the compressor disk 16 and a plurality of radial compressor blades 18 and the turbine 14 consists of the turbine disk 20 and the radial turbine blades 22 and a shaft 24 rigidly connecting the turbine and compressor suitable supported for rotary motion (not shown). Structural member 26 associated with the compressor 12 and defining and inlet and discharge portion thereof and structural member 28 associated with turbine 14 and defining an inlet and discharge portion thereof, serve to direct the fluid into and out of the compressor and into and out of the turbine respectively. Obviously, the air from ambient is admitted into the compressor at the inlet 30 where the air is compressed and discharged through the discharge 32. This compressor discharge air is delivered to the recuperator, not shown, pre-heated and then admitted into the combustor, not shown. The combusted products, namely, fuel and air, is then admitted to the turbine via inlet 34 and discharged via outlet 36, the details of which are described in the above referenced documents and apparatus.

What has been described is well known in the art and does not constitute a part of this invention. This invention is concerned with solving the problem of maintaining constant efficiencies of the microturbine engines of a given model that are coming off of the assembly line. In other words, because of the tolerances in the engine and manufacturing tolerances in manufacturing the engines, there is a tendency that the efficiency of the engines fluctuates and the purpose of this invention is to address one of the areas in the engine that contribute to this fluctuation. As can be seen from FIG. 1 there is a space 40 between the compressor 12 and the turbine 14. Heretofore, that space remained unoccupied. This invention provides an annular shaped seal plate generally indicated by reference numeral 42 and an annular brush seal generally indicated by reference numeral 44 mounted in space 40. There is little flow in space 40 and this space is relatively quiescent, however, a small amount of flow migrates from the compressor and flows toward the turbine. This small amount of flow varies from engine to engine. The purpose of the this invention is to control this amount of flow or leakage flow by providing a seal on the shaft between the compressor and turbine and judiciously placing discrete holes 46 in the segmented seal plates segmented portion 48 being one half thereof, and segmented portion 48a being the other half. In this embodiment seal plate 42 is made from two segments, and as one skilled in the art will appreciate, the number of segments is merely a matter of design choice. In accordance with this invention each of the segments of the seal plate 42 is generally U-shaped in cross section and includes a long arm 50 and a short arm 52 radially extending toward the center line, with the long arm 50 being mounted adjacent to the compressor disc 16 and the short arm 52 being mounted adjacent to the turbine disk 20.

The brush seal 44 comprises a back plate 56 and a front plate 58 and one end of each of the plurality of bristles 60 mounted therebetween and held in place by any suitable means, such as by welding or brazing. This assembly, namely, the back plate 56, front plate 58 and bristles 60 are affixed to the end of arm 50 so that the ends of bristles 60 remote from the attached end thereof bears against shaft 24. As mentioned above, any well known brush seal can be utilized as this is not deemed essential to this invention. However, because the tolerances of the brush seals and the manufacturing tolerances of the engine components vary from engine to engine, the leakage of the brush seal tend to maintain good sealing notwithstanding distortion of the shaft during engine excursions.

According to this invention, the holes 46 are designed to have a given cross sectional area to provide a given pressure drop across each hole and hence, control the amount of leakage passing by the brush seal. The mounting of the brush seal by the particular segmented seal plate between the compressor and turbine and the inclusion of the holes 46 serve to maintain a constant efficiency of all the engines of a particular model being manufactured.

What has been described by this invention is a barrier formed in the cavity between the compressor and turbine so that the leakage flow from the compressor is metered to define cooling air flow for cooling the turbine. A segmented seal plate and seal form the barrier and discrete holes in the seal plate form metering holes to control the flow to the turbine. Because the leakage and cooling remain relatively the same from engine to engine, the efficiency scatter is reduced for all the engines of that model being manufactured.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. For a microturbine engine having a compressor and a turbine mounted back to back, a shaft interconnecting the compressor and turbine, a segmented seal plate mounted in the space between the compressor and turbine and a brush seal affixed to the seal plate for defining a barrier between the compressor and turbine for sealing the leakage flow of fluid in said space flowing from said compressor toward said turbine and at least one hole in said seal plate located above said brush seal for flowing a predetermined amount of cooling flow to said turbine so that other microturbine engines of the same model will have substantially the same engine efficiency of said microturbine engine, wherein said segmented seal plate is generally U-shaped in cross section having a first arm located adjacent the compressor and a second arm located adjacent said turbine, said first arm being radially longer than said second arm and said brush seal being affixed to said first arm.

2. For a microturbine engine as claimed in claim 1 including a plurality of circumferentially spaced holes located above said brush seal for flowing a predetermined amount of cooling flow from said compressor toward said turbine.

3. In combination, a compressor comprising a compressor disk and a plurality of radial inflow compressor blades and a turbine disk having a plurality of radial inflow turbine blades, said compressor disk and said turbine disk interconnected by a shaft, said turbine disk being mounted in back to back relation with said compressor disk and defining a space there between, a small portion of fluid being compressed by said compressor blades leaking into said space between said compressor disk and said turbine disk, the improvement comprising a seal plate extending radially in said space toward said shaft, a brush seal supported by said seal plate having a plurality of bristles having an end portion bearing against said shaft for sealing off the flow from said compressor, a plurality of holes located in said seal plate above said bristles to flow a predetermined amount of leaking fluid from said compressor disk toward said turbine disk whereby the amount of cooling flow from engine to engine remains constant, wherein seal plate is segmented, said seal plate being U-shaped in cross section having a first arm and a second arm, said first arm being longer than said second arm, said brush seal being affixed to said first arm, wherein said first arm is located adjacent to said compressor disk and said second arm is located adjacent to said turbine disk.

4. The combination of claim 3 wherein said plurality of holes are circumferentially spaced about said seal plate.

5. A system for reducing efficiency scatter in microturbine engines of the same model coming off an assembly line, each engine of said microturbine engines includes a compressor and turbine mounted back to back and defining a cavity there between, a shaft disposed in said cavity interconnecting the compressor and turbine for rotary motion, the improvement comprising a segmented seal plate mounted in the cavity between the compressor and turbine and a seal affixed to the seal plate for defining a barrier between the compressor and turbine for sealing the leakage flow of fluid in flowing from said compressor, said barrier defining a fore compartment and an aft compartment, at least one hole in said seal plate located above said seal for flowing a predetermined amount of cooling flow to said aft compartment and to said turbines, whereby the leakage flow feeding said fore compartment remains relatively the same for each of said microturbine engines coming off the assembly line, wherein said segmented seal plate is generally U-shaped in cross section having a first arm located adjacent the compressor and a second arm located adfacent asid turbine, said first arm being radially longer than said second arm and said brush seal being affixed to said first arm.

6. A system for reducing efficiency scatter in microturbine engines of the same model coming off an assembly line as claimed in claim 5 wherein said seal is a brush seal and including a plurality of circumferentially spaced holes located above said brush seal for flowing a predetermined amount of cooling flow from said compressor toward said turbine.

* * * * *